United States Patent
Astigarraga et al.

(10) Patent No.: US 10,567,406 B2
(45) Date of Patent: *Feb. 18, 2020

(54) CLOUD COMPUTING ENVIRONMENT ACTIVITY MONITORING

(71) Applicant: International Business Machines Corporation, Armonk, NY (US)

(72) Inventors: Tara Astigarraga, Fairport, NY (US); Christopher V. DeRobertis, Hopewell Junction, NY (US); Louie A. Dickens, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/238,645

(22) Filed: Aug. 16, 2016

(65) Prior Publication Data

US 2018/0054454 A1     Feb. 22, 2018

(51) Int. Cl.
*H04L 29/06* (2006.01)
*H04L 12/26* (2006.01)
*H04L 29/08* (2006.01)

(52) U.S. Cl.
CPC .......... *H04L 63/1425* (2013.01); *H04L 43/10* (2013.01); *H04L 67/10* (2013.01)

(58) Field of Classification Search
CPC ...... H04L 63/1425; H04L 43/10; H04L 67/10
See application file for complete search history.

(56) References Cited

U.S. PATENT DOCUMENTS

| | | | |
|---|---|---|---|
| 7,793,138 B2 | 9/2010 | Rastogi et al. | |
| 7,958,159 B1* | 6/2011 | Tran | G06F 17/30507 707/634 |
| 8,656,066 B2 | 2/2014 | Johnson et al. | |
| 8,935,493 B1 | 1/2015 | Dolan et al. | |
| 8,959,633 B1* | 2/2015 | Dokey | G06F 21/50 705/30 |
| 9,600,320 B2* | 3/2017 | Hamilton, II | G06F 9/45558 |
| 2007/0005297 A1* | 1/2007 | Beresniewicz | G05B 23/0235 702/181 |
| 2007/0143552 A1 | 6/2007 | Rastogi et al. | |
| 2012/0131278 A1* | 5/2012 | Chang | G06F 12/0893 711/118 |
| 2014/0317681 A1* | 10/2014 | Shende | H04L 63/10 726/1 |
| 2016/0232024 A1* | 8/2016 | Hamilton, II | G06F 9/45558 |

(Continued)

OTHER PUBLICATIONS

QuickSpecs, HP B-series San Network Advisor Software, C04111715 DA 13169 Worldwide, Version 16, Oct. 17, 2014, Retrieved From -http://www8.hp.com/h20195/v2/getpdf.aspx/c04111715.pdf?ver=16 on Aug. 16, 2016.

(Continued)

*Primary Examiner* — Mohammad A Siddiqi
(74) *Attorney, Agent, or Firm* — Zilka-Kotab, P.C.

(57) ABSTRACT

A computer-implemented method according to one embodiment includes identifying a cloud computing environment, establishing a baseline associated with input and output requests within the cloud computing environment, monitoring activity associated with the cloud computing environment, comparing the activity to the baseline, and performing one or more actions, based on the comparing.

17 Claims, 5 Drawing Sheets

(56) References Cited

U.S. PATENT DOCUMENTS

| | | | |
|---|---|---|---|
| 2016/0378691 A1* | 12/2016 | Sherman | G06F 3/06 711/163 |
| 2017/0011655 A1 | 1/2017 | Sakezles et al. | |
| 2017/0078314 A1* | 3/2017 | Mohanty | H04L 63/1425 |
| 2017/0116552 A1* | 4/2017 | Deodhar | G06Q 10/06316 |
| 2018/0054453 A1* | 2/2018 | Astigarraga | H04L 63/1425 |
| 2019/0089728 A1 | 3/2019 | Astigarraga et al. | |

OTHER PUBLICATIONS

Strutt, S., "Enhancing IBM Tivoli SAN Manager Device Availability Alerting," IBM Redbooks Paper, 2004, pp. 1-18.
Brocade, "Storage Fabrics Technology," retrieved from http://www.brocade.com/en/possibilities/technology/storage-fabrics-technology.html on Aug. 16, 2016, pp. 1-6.
Nist, "NIST Cloud Computing Program," The National Institute of Standards and Technology, Nov. 15, 2010, pp. 1-2.
Mell et al., "The NIST Definition of Cloud Computing," National Institute of Standards and Technology, Information Technology Laboratory, Oct. 7, 2009, pp. 1-2.
Mell et al., "The NIST Definition of Cloud Computing," NIST Special Publication 800-145, Sep. 2011, pp. 1-7.
Lippitt et al., "Networked Storage Concepts and Protocols," $EMC^2$ Techbooks, Version 3.0, 2014, pp. 1-370.
Dwivedi, H., "Storage Security," BlackHat Powerpoint Presentation, 2003, pp. 1-68.
RSA $EMC^2$, "Dectect & Investigate Threats," RSA Security Analytics, Data Sheet, 2012, pp. 1-6.
Brocade, "The Growing Need for Security in Storage Area Networks," Brocade White Paper, 2011, pp. 1-15.
Astigarraga et al., U.S. Appl. No. 15/238,606, filed Aug. 16, 2016.
List of IBM Patents or Patent Applications Treated As Related.
NSA, "Securing Fibre Channel Storage Area Networks," National Security Agency, pp. 1-4.
Non-Final Office Action from U.S. Appl. No. 15/238,606, dated Apr. 3, 2018.
Notice of Allowance from U.S. Appl. No. 15/238,606, dated Jul. 20, 2018.
Non-Final Office Action from U.S. Appl. No. 15/238,606, dated Oct. 19, 2018.
Astigarraga et al., U.S. Appl. No. 16/196,354, filed Nov. 20, 2018.
Final Office Action from U.S. Appl. No. 15/238,606, dated Mar. 1, 2019.
Notice of Allowance from U.S. Appl. No. 15/238,606, dated Jun. 4, 2019.
Non-Final Office Action from U.S. Appl. No. 16/196,354, dated Aug. 26, 2019.
Notice of Allowance from U.S. Appl. No. 15/238,606, dated Aug. 28, 2018.

* cited by examiner

CLOUD COMPUTING ENVIRONMENT ACTIVITY MONITORING

BACKGROUND

The present invention relates to data security, and more specifically, this invention relates to detecting and responding to security threats within a cloud computing environment.

Cloud computing environments have a plurality of potential security threats, including risks of client data theft, data removal, data contamination, etc. It is therefore important to quickly detect and contain threats and breaches in order to minimize exposure and risk to clients.

SUMMARY

A computer-implemented method according to one embodiment includes identifying a cloud computing environment, establishing a baseline associated with input and output requests within the cloud computing environment, monitoring activity associated with the cloud computing environment, comparing the activity to the baseline, and performing one or more actions, based on the comparing.

According to another embodiment, a computer program product for monitoring activity associated with a cloud computing environment comprises a computer readable storage medium having program instructions embodied therewith, wherein the computer readable storage medium is not a transitory signal per se, and where the program instructions are executable by a processor to cause the processor to perform a method comprising identifying the cloud computing environment, utilizing the processor, establishing, utilizing the processor, a baseline associated with input and output requests within the cloud computing environment, monitoring the activity associated with the cloud computing environment, utilizing the processor, comparing the activity to the baseline, utilizing the processor, and performing, utilizing the processor, one or more actions, based on the comparing.

A system according to another embodiment includes a processor and logic integrated with the processor, executable by the processor, or integrated with and executable by the processor, where the logic is configured to identify a cloud computing environment, establish a baseline associated with input and output requests within the cloud computing environment, monitor activity associated with the cloud computing environment, compare the activity to the baseline, and perform one or more actions, based on the comparison.

Other aspects and embodiments of the present invention will become apparent from the following detailed description, which, when taken in conjunction with the drawings, illustrate by way of example the principles of the invention.

DETAILED DESCRIPTION

Figure 1:
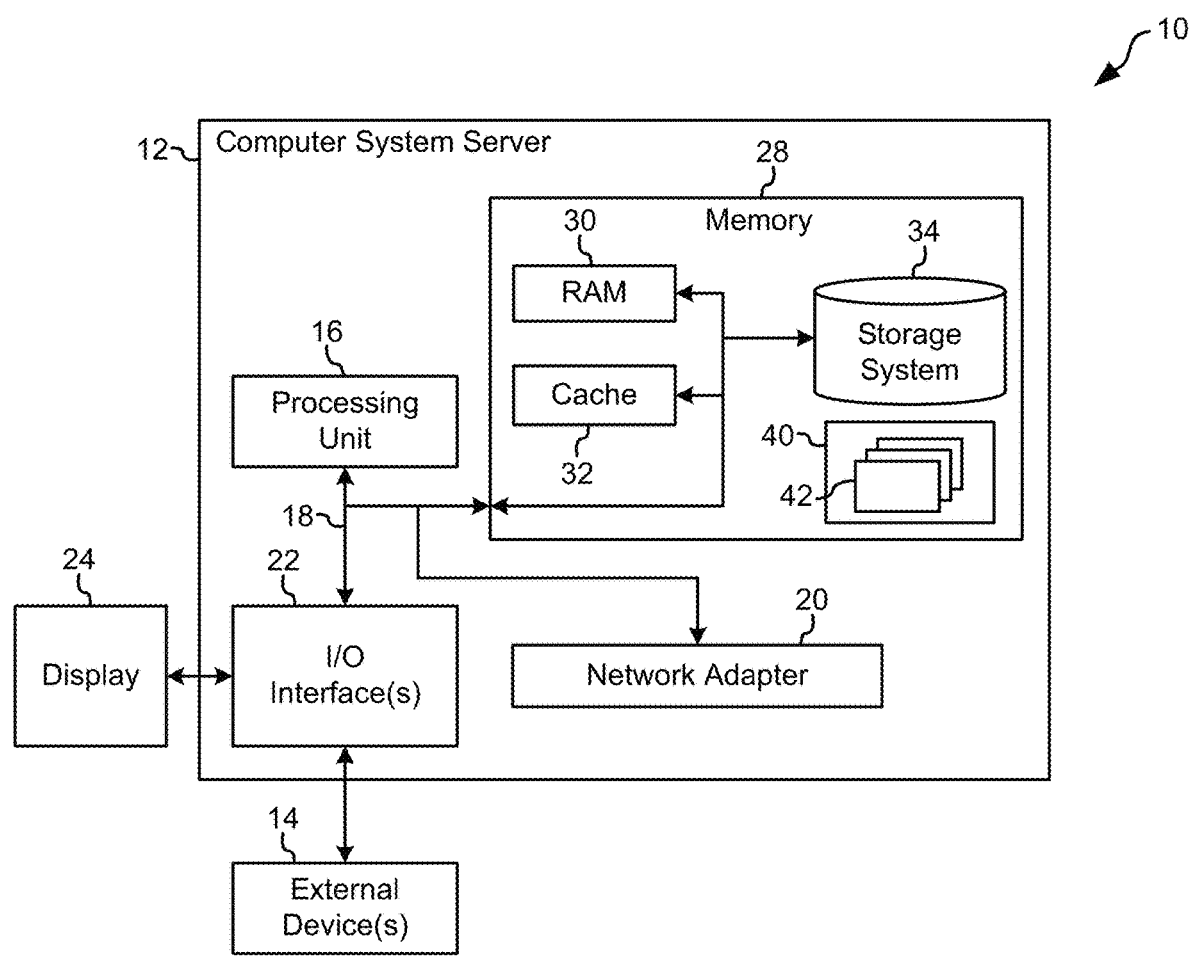
FIG. 1 depicts a cloud computing node according to an embodiment of the present invention.

The following description discloses several preferred embodiments of systems, methods and computer program products for performing cloud computing environment activity monitoring. Various embodiments provide a method to compare monitored environment activity to a calculated baseline, and perform further action when the baseline is exceeded by the activity.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing cloud computing environment activity monitoring.

In one general embodiment, a computer-implemented method includes identifying a cloud computing environment, establishing a baseline associated with input and output requests within the cloud computing environment, monitoring activity associated with the cloud computing environment, comparing the activity to the baseline, and performing one or more actions, based on the comparing.

In another general embodiment, a computer program product for monitoring activity associated with a cloud computing environment comprises a computer readable storage medium having program instructions embodied therewith, wherein the computer readable storage medium is not a transitory signal per se, and where the program instructions are executable by a processor to cause the processor to perform a method comprising identifying the cloud computing environment, utilizing the processor, establishing, utilizing the processor, a baseline associated with input and output requests within the cloud computing environment, monitoring the activity associated with the cloud computing environment, utilizing the processor, comparing the activity to the baseline, utilizing the processor, and performing, utilizing the processor, one or more actions, based on the comparing.

In another general embodiment, a system includes a processor and logic integrated with the processor, executable by the processor, or integrated with and executable by the processor, where the logic is configured to identify a cloud computing environment, establish a baseline associated with input and output requests within the cloud computing environment, monitor activity associated with the cloud computing environment, compare the activity to the baseline, and perform one or more actions, based on the comparison.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
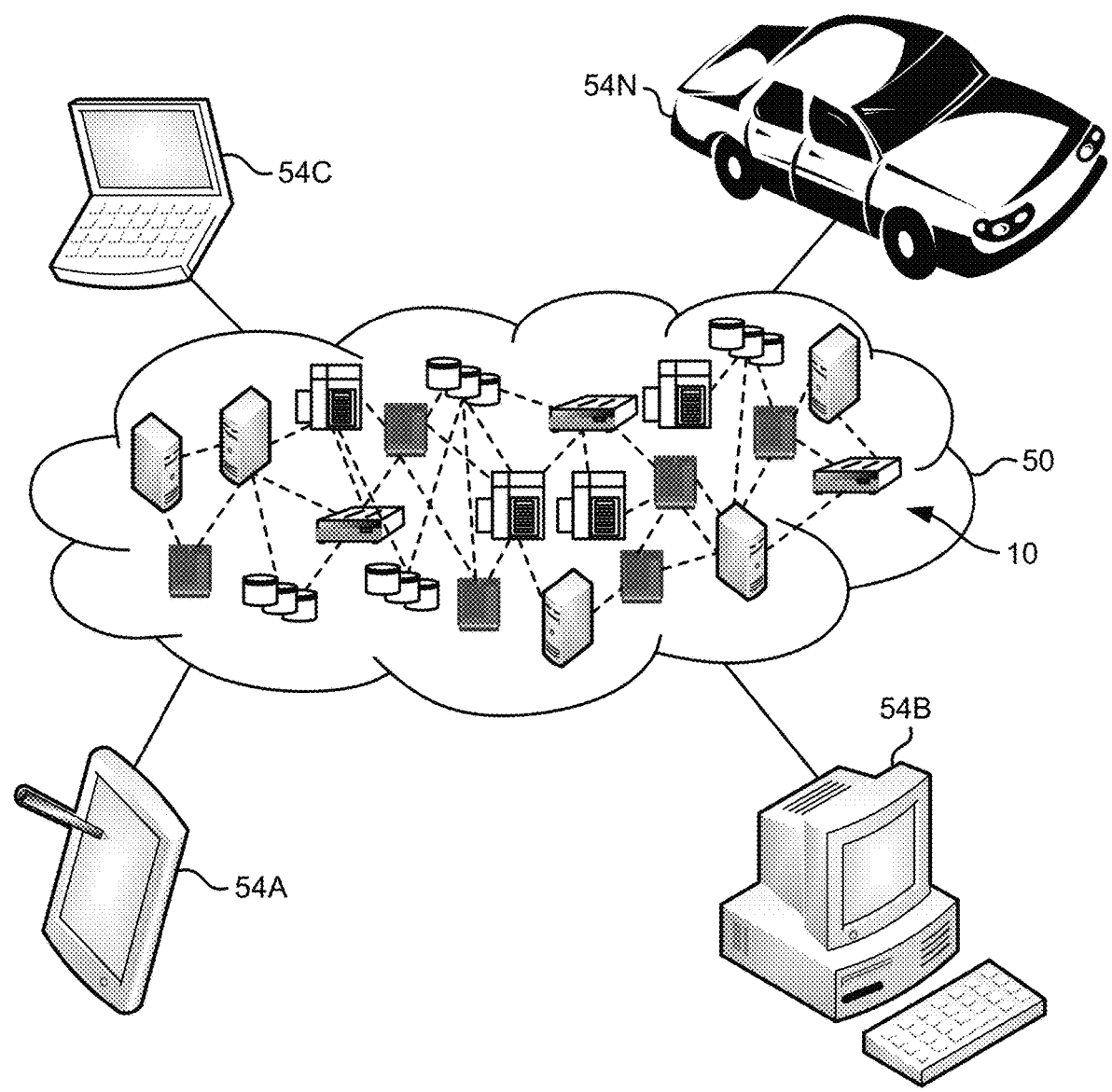
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
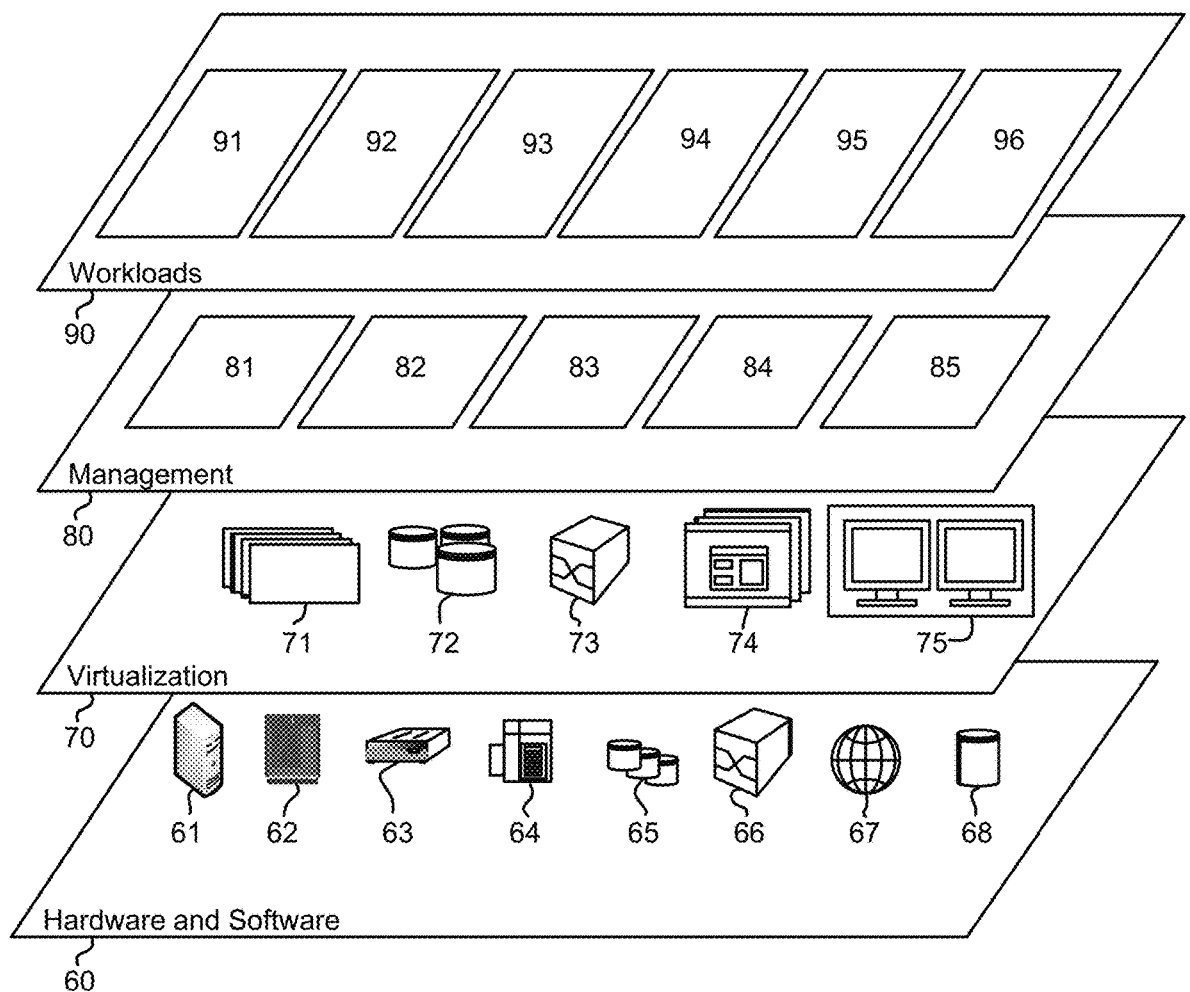
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage 96.

Figure 4:
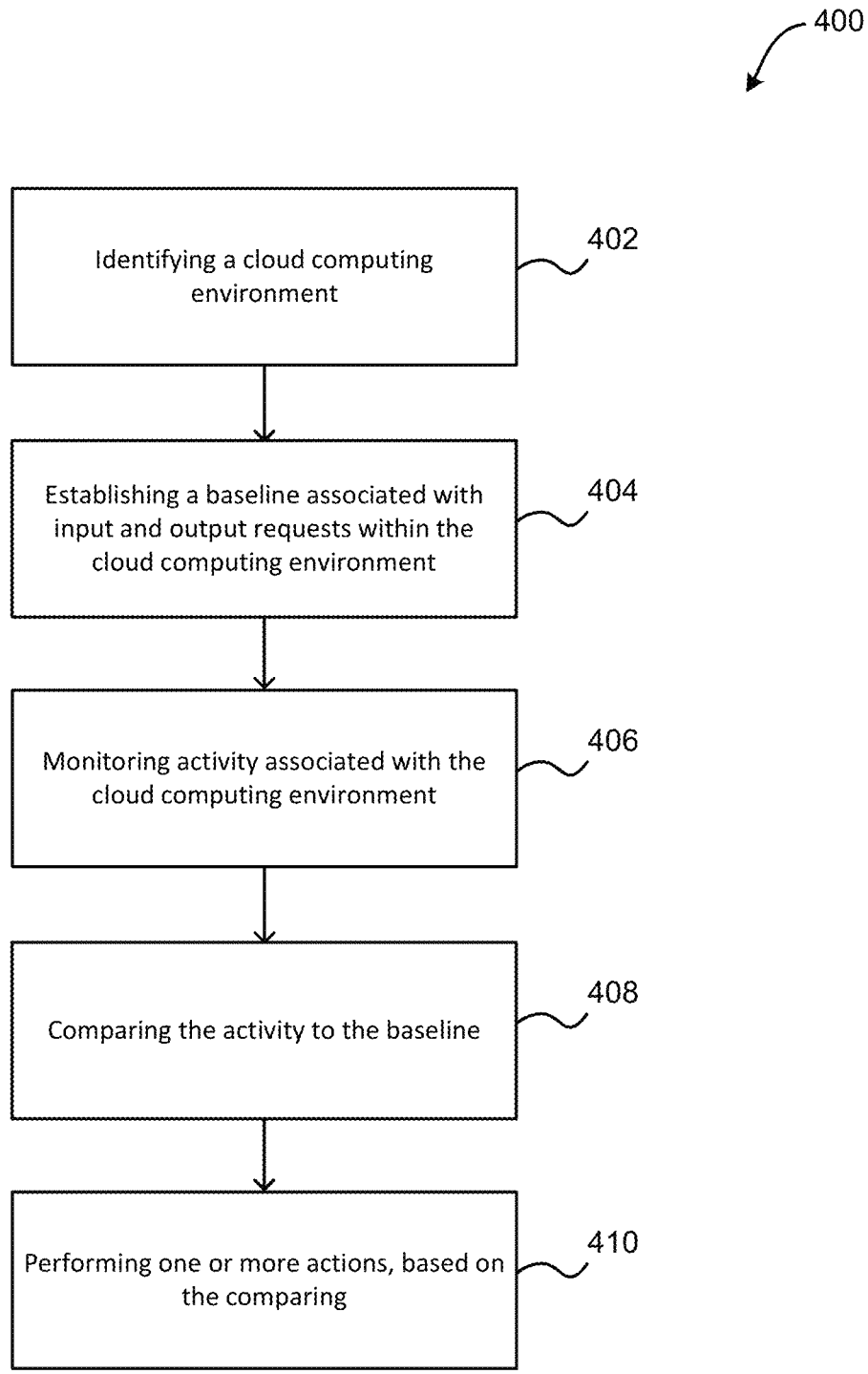
FIG. 4 illustrates a method for performing cloud computing environment activity monitoring, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a cloud computing environment is identified. In one embodiment, the cloud computing environment may include one or more cloud-based storage devices. For example, the cloud computing environment may include one or more of networked storage devices, a storage area network (SAN), a block storage environment, a cloud storage environment, a hybrid cloud storage environment, etc. In another embodiment, the cloud computing environment may include an embedded storage component. For example, the cloud computing environment may include flash storage embedded in one or more servers, one or more network switches, etc. In another embodiment, the cloud computing environment may be identified by a component of the environment, a device outside of the environment (e.g., a server device, a switch, etc.), etc. In yet another embodiment, software defined storage (SDS) may be implemented within the cloud computing environment.

Additionally, as shown in FIG. 4, method 400 may proceed with operation 404, where a baseline associated with input and output requests within the cloud computing environment is established. In one embodiment, the baseline may indicate an expected input/output (I/O) read and write pattern to the environment, an expected I/O read and write pattern within the environment, etc. In another embodiment, the baseline may indicate one or more of an amount of read and write requests received by the environment, an amount of read and write requests executed within the environment, a ratio or percentage of reads to writes made to the cloud computing environment, etc.

Further, in one embodiment, the baseline may have one or more associated temporal constraints. For example, the baseline may be linked to a predetermined time of day, day of the week, period of the year, etc. In another example, the baseline be linked to one or more holidays in one or more predetermined geographical areas (e.g., for North America, the day after Thanksgiving, Cyber Monday, black Friday week, etc.). In another embodiment, the baseline may be associated with one or more time and/or date based special rates.

Further still, in one embodiment, the baseline may be obtained by performing active listening to and/or monitoring of the cloud computing environment. For example, listening software may be deployed within the cloud computing environment to monitor input and output for the cloud computing environment for a predetermined period of time (e.g., one or more hours, days, months, years, etc.). In another embodiment, the monitoring may include identifying and logging reads and writes received by the cloud computing environment, executed within the cloud computing environment, etc.

Also, in one embodiment, the baseline may reflect analytics of average read and write data exchange I/O patterns for a given time period for the cloud computing environment. For example, the baseline may be based on monitored averages for the cloud computing environment during different times/dates. In another example, the baseline may be verified by one or more users (e.g., one or more administrators of a system, etc.). In another embodiment, the baseline may be established by a component of the cloud computing environment, a device outside of the environment (e.g., a server device, a switch, etc.), etc. In yet another embodiment, the baseline may be created and input by one or more users (e.g., an administrator using a graphical user interface (GUI) of a system, etc.).

In addition, in one embodiment, the baseline may be established based on one or more criteria. For example, the baseline may indicate one or more predetermined volumes (e.g., a predetermined volume of reads to the cloud computing environment, a predetermined volume of writes to the cloud computing environment, etc.). In another example, the baseline may indicate predetermined percentages of reads and writes to the cloud computing environment (e.g., 80% reads, 20% writes, etc.).

In another embodiment, establishing the baseline may include determining one or more identifiers associated with the input and output requests within the cloud computing environment. For example, one or more of a storage ID, a source ID, a destination ID, and a fibre channel ID (FCID) may be determined for one or more of the input and output requests within the cloud computing environment during the monitoring of the input and output for the cloud computing environment. In yet another embodiment, the determined one or more identifiers may be logged and/or incorporated into the baseline.

Furthermore, as shown in FIG. 4, method 400 may proceed with operation 406, where activity associated with the cloud computing environment is monitored. In one embodiment, the activity may include current input and output (I/O) patterns for the cloud computing environment. For example, the monitored activity may include a current volume of reads and writes to the cloud computing environment, a current percentage of reads and writes to the cloud computing environment, a time and date associated with reads and writes, any holidays associated with the time and date, etc. In another embodiment, the activity may be monitored for a predetermined period of time (e.g., a current hour, day, week, month, year, etc.). In yet another embodiment, one or more identifiers associated with the activity may be determined during the monitoring. For example, one or more of a storage ID, a source ID, a destination ID, and a fibre channel ID (FCID) associated with the activity may be determined during the monitoring.

Further still, in one embodiment, the activity may be monitored utilizing an active monitoring mode of one or more components (e.g., one or more components of the cloud computing environment, one or more components outside of the cloud computing environment, etc.). In another embodiment, the baseline associated with input and output requests within the cloud computing environment may be updated, based on the monitoring. In this way, the baseline may be continuously updated.

Also, as shown in FIG. 4, method 400 may proceed with operation 408, where the activity is compared to the baseline. In one embodiment, comparing the activity to the baseline may include determining whether the activity represents an anomaly for the cloud computing environment. For example, comparing the activity to the baseline may include determining whether the activity falls above or below the baseline by at least a predetermined amount. In another embodiment, the time and date of the activity may be considered during the comparing. For example, the time and date of the activity may be identified, a portion of the baseline having a similar time and date may be identified, and the activity may be compared to the portion of the baseline. In yet another embodiment, comparing the activity to the baseline may include comparing one or more identifiers associated with the activity that are determined during the monitoring to one or more identifiers incorporated into the baseline.

Additionally, as shown in FIG. 4, method 400 may proceed with operation 410, where one or more actions are performed, based on the comparing. In one embodiment, performing the one or more actions may include flagging the activity if the activity deviates from the baseline by more than a predetermined amount. For example, the activity may be flagged as an anomaly if the activity deviates from the baseline by more than a predetermined amount. For instance, the activity may include a downloading of an abnormally large volume of data from one or more storage devices of the cloud computing environment, an uploading of a large volume of write data in an abnormal pattern or to an abnormal location within the cloud computing environment, etc.

Further, in one embodiment, performing the one or more actions may include examining the activity if the activity is flagged as an anomaly. For example, examining the activity may include comparing the activity to one or more predetermined security threat criteria. For instance, the security threat criteria may include user-submitted criteria indicative of a security threat, criteria indicative of a threat that was developed based on previous monitoring of the cloud computing environment (e.g., before the current activity is monitored), etc.

Further still, in one embodiment, one or more security actions may be performed when the activity flagged as the anomaly is determined to be a security threat as a result of the examining. For example, the one or more security actions may include determining one or more identifiers for the activity (e.g., a storage ID, a source ID, a destination ID, etc.). In another example, the one or more security actions may include notifying one or more parties (e.g., one or more users, administrators, owners, etc.) that a security threat is identified for the cloud computing environment.

In yet another example, the one or more security actions may include determining and blocking one or more identifiers associated with the activity (e.g., one or more FCIDs (fibre channel IDs), one or more source/destination IDs, one or more IP addresses, one or more media access control (MAC) addresses, etc.). In still another example, one or more security actions may include blocking one or more storage or switch ports within the cloud computing environment that are associated with the activity, fencing one or more predetermined storage devices within the cloud computing environment, disabling one or more storage devices within the cloud computing environment, etc.

Also, in one embodiment, one or more of the security actions may be performed automatically in response to the activity being flagged as an anomaly. In another embodiment, the baseline may be used to automatically anticipate and react to expected deviations that occur within the cloud computing environment in the future according to the baseline. For example, additional storage within the cloud computing environment and/or additional paths within the environment may be provided to prepare for increased I/O activity within the cloud computing environment during a predetermined period of time. In another example, incentives such as preferred pricing to move from one service tier to another may be provided to one or more users if a comparison of the activity to the baseline indicates that a tier threshold associated with the one or more users may be exceeded due to current data usage.

In this way, activity statistics may be constantly monitored and compared against predetermined baselines in order to identify activity that could potentially pose a risk to the cloud computing environment.

Figure 5:
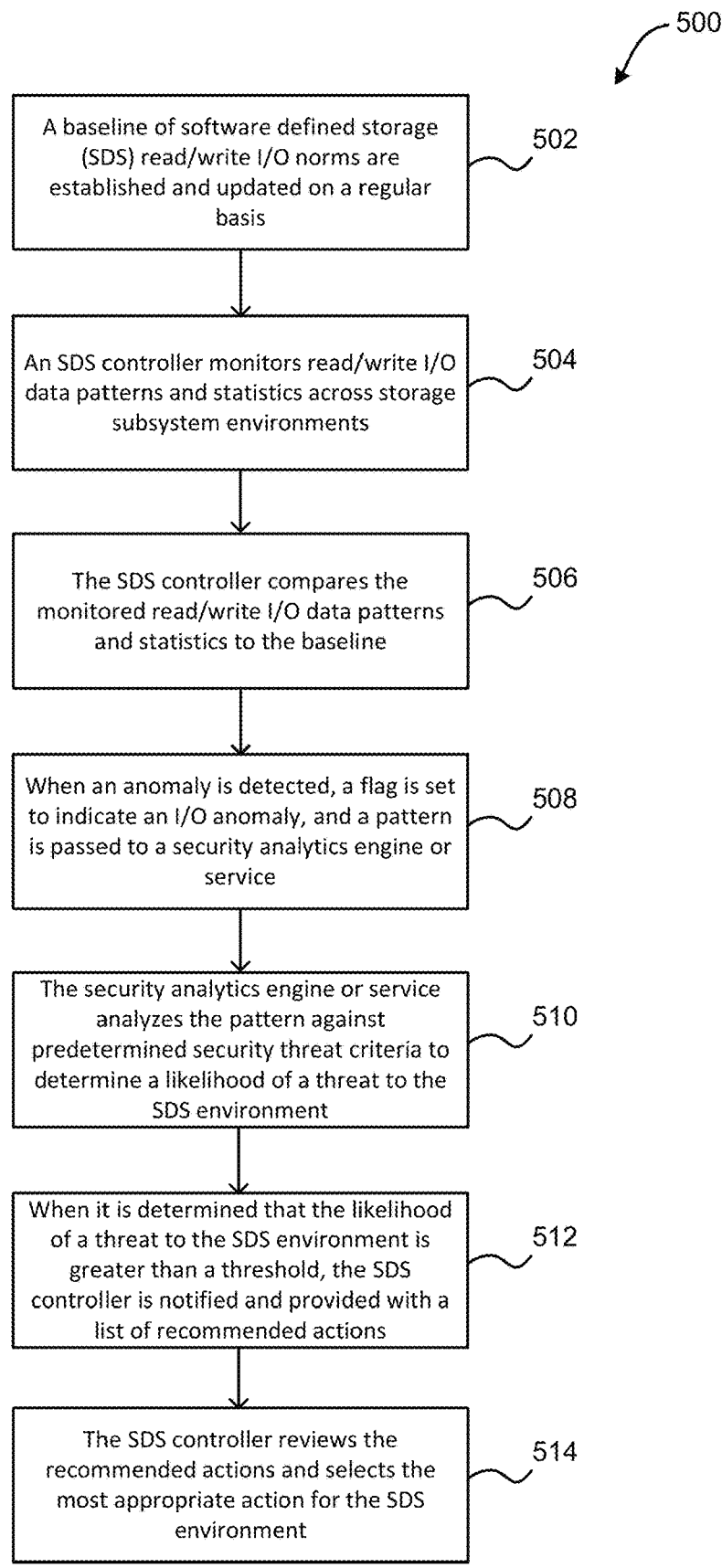
FIG. 5 illustrates a method for performing a security analysis on a storage area network (SAN) environment, in accordance with one embodiment.

Now referring to FIG. 5, a flowchart of a method 500 for performing a security analysis on a storage area network (SAN) environment is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a baseline of software defined storage (SDS) read/write I/O norms are established and updated on a regular basis. In one embodiment, the baseline may be established by an SDS monitor or other software component. In another embodiment, the baseline may be established by one or more switches within the SDS environment, one or more flow control modules within the SDS environment, etc.

Additionally, method 500 may proceed with operation 504, where an SDS controller monitors read/write I/O data patterns and statistics across storage subsystem environments. Further, method 500 may proceed with operation 506, where the SDS controller compares the monitored read/write I/O data patterns and statistics to the baseline. In one embodiment, the comparing may be performed on a recurring basis (e.g., once a predetermined amount of time (e.g., a minute, etc.) has passed, etc.). In another embodiment, the comparing may account for one or more defined variance variables, such as a holiday, a predetermined time period, etc.

Further still, method 500 may proceed with operation 508, where when an anomaly is detected as a result of the comparison, a flag associated with the monitored read/write I/O data patterns and statistics is set to indicate an I/O anomaly, and a pattern indicated by the monitored read/write I/O data patterns and statistics is passed to a security analytics engine or service. In one embodiment, the event may be logged and an SDS administrator may be notified when the anomaly is detected.

In another embodiment, the anomaly may be detected when it is determined that the monitored read/write I/O data patterns and statistics deviate from the baseline by more than a predetermined amount. In yet another embodiment, when an anomaly is not detected as a result of the comparison, the SDS controller may continue to monitor read/write I/O data patterns and statistics and compare the read/write I/O data patterns and statistics to the baseline.

Also, method 500 may proceed with operation 510, where the security analytics engine or service analyzes the pattern against predetermined security threat criteria to determine a likelihood of a threat to the SDS environment. For example, the security analytics engine or service may analyze the pattern to determine whether the pattern indicates a non-malicious bump in activity (e.g., based on increased sales, etc.) or whether the pattern indicates malicious intent/a threat to the SDS environment.

In addition, method 500 may proceed with operation 512, where when it is determined by the security analytics engine or service that the likelihood of a threat to the SDS environment is greater than a predetermined threshold, the SDS controller is notified that a threat was detected, and the SDS controller is provided with a list of recommended actions. In one embodiment, the recommended actions may include logging the event and optionally notifying an SDS administrator. In another embodiment, the recommended actions may include blocking one or more certain fibre channel IDs (FCIDs) associated with the threat, blocking one or more source/destination IDs associated with the threat, blocking one or more IP addresses associated with the threat, blocking one or more MAC addresses associated with the threat, shutting certain storage or switch ports associated with the threat, fencing particular storage devices associated with the threat, etc.

In another embodiment, when it is determined by the security analytics engine or service that the likelihood of a threat to the SDS environment is less than the predetermined threshold, the SDS controller may continue to monitor read/write I/O data patterns and statistics and compare the read/write I/O data patterns and statistics to the baseline.

Furthermore, method 500 may proceed with operation 514, where the SDS controller reviews the recommended actions and selects the most appropriate action for the SDS environment. In one embodiment, the SDS controller may then implement the most appropriate action. In yet another embodiment, once the action is taken, the SDS controller may compare updated read/write I/O data patterns and statistics to the baseline, and may determine whether the updated read/write I/O data patterns and statistics deviate from the baseline by more than a predetermined amount.

If no deviation is detected (e.g., the monitored read/write I/O data patterns and statistics did return to the expected baseline), the SDS controller may continue to monitor current read/write I/O data patterns and statistics and compare the read/write I/O data patterns and statistics to the baseline. If a deviation is detected (e.g., the monitored read/write I/O data patterns and statistics did not return to the expected baseline), a flag associated with the monitored read/write I/O data patterns and statistics is set to indicate a repeat I/O anomaly, and the pattern indicated by the monitored read/write I/O data patterns and statistics is passed to the security analytics engine or service.

In this way, read/write I/O trend baselines may be defined and continually updated for a cloud computing environment, and I/O statistics associated with the cloud computing environment may be continually measured against those baselines. As anomalies are detected, risk/security analytics may be used to determine a likelihood that deviations from the baselines should be treated as a security threat. If an anomaly is categorized as a threat, proactive measures may be taken to minimize exposure and protect data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a cloud computing environment;
   establishing a baseline including a ratio of logged read requests received by the cloud computing environment for a first predetermined time period to logged write requests received by the cloud computing environment for the first predetermined time period, including determining and logging an identifier associated with the ratio of logged read requests to logged write requests received by the cloud computing environment for the first predetermined time period;
   monitoring activity associated with the cloud computing environment, including a ratio of current read requests to current write requests received by the cloud computing environment, the monitoring including determining an identifier associated with the ratio of current read requests to current write requests received by the cloud computing environment;
   comparing the activity to the baseline, including comparing the identifier associated with the ratio of current read requests to current write requests received by the cloud computing environment to the logged identifier associated with the logged read requests and logged write requests received by the cloud computing environment for the first predetermined time period; and performing one or more security actions within the cloud computing environment, based on the comparing, including blocking the identifier associated with the ratio of current read requests to current write requests received by the cloud computing environment, in response to determining that the activity is a security threat.

2. The computer-implemented method of claim 1, wherein the baseline further includes:
   a volume of the logged read requests made to the cloud computing environment for the first predetermined time period, and
   a volume of the logged write requests made to the cloud computing environment for the first predetermined time period.

3. The computer-implemented method of claim 1, wherein the activity further includes:
   a volume of the current read requests received by the cloud computing environment for a current predetermined time period, and
   a volume of the current write requests received by the cloud computing environment for the current predetermined time period.

4. The computer-implemented method of claim 1, wherein:
   comparing the activity to the baseline includes flagging the activity in response to determining that the activity deviates from the baseline by more than a predetermined amount,
   performing the one or more security actions includes, in response to flagging the activity:
   comparing the activity to one or more predetermined threat criteria, and
   determining and blocking one or more identifiers associated with the activity, in response to determining that the activity is a security threat in response to comparing the activity to the one or more predetermined threat criteria.

5. The computer-implemented method of claim 1, wherein the comparing is performed on a recurring basis according to a predetermined amount of time.

6. The computer-implemented method of claim 1, wherein performing the one or more security actions includes flagging the activity as an anomaly in response to determining that the activity deviates from the baseline by more than a predetermined amount.

7. The computer-implemented method of claim 6, wherein performing the one or more security actions may include comparing the activity to one or more predetermined security threat criteria in response to determining that the activity is flagged as the anomaly.

8. The computer-implemented method of claim 7, wherein one or more security actions are performed in response to determining that the activity flagged as the anomaly is a security threat as a result of the comparing of the activity to the one or more predetermined security threat criteria.

9. A computer program product for monitoring activity associated with a cloud computing environment, the computer program product comprising a computer readable storage medium having program instructions embodied therewith, wherein the computer readable storage medium is not a transitory signal per se, the program instructions executable by a processor to cause the processor to perform a method comprising:
   identifying the cloud computing environment, utilizing the processor;
   establishing, utilizing the processor, a baseline including a ratio of logged read requests received by the cloud computing environment for a first predetermined time period to logged write requests received by the cloud computing environment for the first predetermined time period, including determining and logging an identifier associated with the ratio of logged read requests to logged write requests received by the cloud computing environment for the first predetermined time period;
   monitoring the activity associated with the cloud computing environment, including a ratio of current read requests to current write requests received by the cloud computing environment, utilizing the processor, the monitoring including determining an identifier associated with the ratio of current read requests to current write requests received by the cloud computing environment;
   comparing the activity to the baseline, utilizing the processor, including comparing the identifier associated with the ratio of current read requests to current write requests received by the cloud computing environment to the logged identifier associated with the logged read requests and logged write requests received by the cloud computing environment for the first predetermined time period; and
   performing, utilizing the processor, one or more security actions within the cloud computing environment, based on the comparing, including blocking the identifier associated with the ratio of current read requests to current write requests received by the cloud computing environment, in response to determining that the activity is a security threat.

10. The computer program product of claim 9, wherein the baseline indicates an expected input/output (I/O) pattern to the cloud computing environment.

11. The computer program product of claim 9, wherein the baseline has one or more associated temporal constraints.

12. The computer program product of claim 9, wherein the baseline is obtained by performing active monitoring of the cloud computing environment.

13. The computer program product of claim 9, wherein:
    comparing the activity to the baseline includes flagging the activity in response to determining that the activity deviates from the baseline by more than a predetermined amount,
    performing the one or more security actions includes, in response to flagging the activity:
    comparing the activity to one or more predetermined threat criteria, and
    determining and blocking one or more identifiers associated with the activity, in response to determining that the activity is a security threat in response to comparing the activity to the one or more predetermined threat criteria.

14. The computer program product of claim 9, wherein comparing the activity to the baseline includes determining whether the activity falls above or below the baseline by at least a predetermined amount.

15. The computer program product of claim 9, wherein performing the one or more security actions includes flagging the activity as an anomaly in response to determining that the activity deviates from the baseline by more than a predetermined amount.

16. The computer program product of claim 15, wherein performing the one or more security actions may include comparing the activity to one or more predetermined security threat criteria in response to determining that the activity is flagged as the anomaly.

17. A system, comprising:
a processor; and
logic integrated with the processor, executable by the processor, or integrated with and executable by the processor, the logic being configured to:
identify a cloud computing environment;
establish a baseline including a ratio of logged read requests received by the cloud computing environment for a first predetermined time period to logged write requests received by the cloud computing environment for the first predetermined time period, including determining and logging an identifier associated with the ratio of logged read requests to logged write requests received by the cloud computing environment for the first predetermined time period;
monitor activity associated with the cloud computing environment, including a ratio of current read requests to current write requests received by the cloud computing environment, the monitoring including determining an identifier associated with the ratio of current read requests to current write requests received by the cloud computing environment;
compare the activity to the baseline, including comparing the identifier associated with the ratio of current read requests to current write requests received by the cloud computing environment to the logged identifier associated with the logged read requests and logged write requests received by the cloud computing environment for the first predetermined time period; and
perform one or more security actions within the cloud computing environment, based on the comparison, including blocking the identifier associated with the ratio of current read requests to current write requests received by the cloud computing environment, in response to determining that the activity is a security threat.

* * * * *